United States Patent [19]

Menke et al.

[11] 4,416,785

[45] Nov. 22, 1983

[54] SCALE-INHIBITING COMPOSITIONS OF MATTER

[75] Inventors: Russell O. Menke, Valenica; Michael Bortnik, Los Angeles, both of Calif.

[73] Assignee: UOP Inc., Des Plaines, Ill.

[21] Appl. No.: 379,209

[22] Filed: May 17, 1982

[51] Int. Cl.$^3$ ............................ C02F 5/12; C02F 5/14
[52] U.S. Cl. .................................. 210/699; 210/698; 210/700; 252/180
[58] Field of Search ................ 252/180; 210/698, 699, 210/700

[56] References Cited

U.S. PATENT DOCUMENTS

| | | | |
|---|---|---|---|
| 3,434,969 | 3/1969 | Ralston | 252/180 |
| 3,925,453 | 12/1975 | Clarke III | 260/501 |
| 3,959,167 | 5/1976 | Hwa et al. | 252/180 |
| 3,960,576 | 6/1976 | Carter | 106/14 |
| 3,962,110 | 6/1976 | Tate | 252/181 |
| 4,026,815 | 5/1977 | Kallfass et al. | 252/180 |
| 4,105,581 | 8/1978 | Sexsmith | 252/389 |
| 4,243,591 | 1/1981 | Magin | 260/326 |
| 4,255,259 | 3/1981 | Hwa et al. | 210/699 |

*Primary Examiner*—John E. Kittle
*Assistant Examiner*—Robert A. Wax
*Attorney, Agent, or Firm*—James R. Hoatson, Jr.; Raymond H. Nelson; William H. Page, II

[57] ABSTRACT

Compositions which will inhibit the formation of scale due to calcium carbonate precipitation in recirculating water systems will comprise a mixture of polyvinylpyrrolidone and aminotri(methylenephosphonic acid). The compositions will be present in the water system in a range of from about 2 to about 25 ppm of said system and will contain the components of the composition in a mole ratio in the range of from about 1: to about 1:10 moles of polyvinylpyrrolidone per mole of phosphonic acid.

7 Claims, No Drawings

SCALE-INHIBITING COMPOSITIONS OF MATTER

BACKGROUND OF THE INVENTION

Metals which are used to form apparatus comprising recirculating water systems, steam boilers, cooling towers and other related equipment are subject to the formation of scale which are water-formed deposits. The formation of scale and sludge deposits on the surfaces of these metals constitutes a serious problem involved in the operations of these various apparatus. In addition, the formation of scale, which may be largely attributed to the deposition of salts such as the carbonates, sulfates, phosphates, and hydroxides of calcium and magnesium on the heat transfer surfaces, adversely effects the heat transfer of the aqueous medium and concomitantly reduces the efficiency of the operation. The aforementioned salts of magnesium and calcium may be inherently present in untreated water which is utilized in the various operations.

Heretofore, various methods for removing scale deposits from the metal surfaces of, for example, a recirculating water system have been effected in many various ways. One method has consisted of treating the metal with a hydrochloric solution. However, during the acid cleaning procedure, extreme care must be observed in order to protect the metal against being eaten away or eroded by the acid. Another method has been to inhibit the formation of scale by the addition of a number of materials to the water. For example, polyphosphates have been added to cooling waters not only for preventing or inhibiting scale formation but also to prevent corrosion of the metal surfaces. The polymeric phosphates form water soluble complexes with the calcium and magnesium salts which are responsible for the hardness of the water by preventing the formation of firmly adhering scale covering by disturbing the growth of the crystal lattice. Other materials which have been used for the chemical treatment of water have included tannin, lignins, starches, polyacrylates and polymethacrylates, these compounds being used as sludge conditioners to render the sludge non-sticky and thus more readily manageable.

In addition to the aforementioned materials which are used for the inhibiting of corrosion or scale and in the treatment of equipment such as pumps, heat exchangers, cooling towers, etc. a scale inhibitor is disclosed in U.S. Pat. No. 3,962,110 which comprises a water-soluble polyvinylpyrrolidone having a molecular weight of from about 10,000 to about 1,000,000, said polyvinylpyrrolidone being used in an acidic system which has been made acidic by the addition of a non-oxidizing mineral acid such as hydrochloric acid, sulfuric acid, etc. U.S. Pat. No. 4,026,815 discloses a method for preventing corrosion in water-carrying systems utilizing as a corrosion inhibitor a phosphonocarboxylic acid and a benzimidazole derivative. In a like manner, U.S. Pat. No. 3,959,167 utilizes, as a composition for inhibiting the formation of scale or boiler water, a mixture of an acrylic polymer selected from the group consisting of polymethacrylic acid, polyacrylic acid, and water-soluble salts thereof, a water-soluble chelant such as nitrilotriacetic acid and hydroxyalkylidenediphosphonic acid. In addition, U.S. Pat. No. 4,255,259 also is drawn to a method for inhibiting scale in a boiler water system utilizing, as a scale inhibitor, a composition consisting of copolymers of styrene, sulfonic acid, and maleic anhydride or maleic acid with a water-soluble sulfonic acid.

As will hereinafter be shown in greater detail, it has now been discovered that the formation of scale in such equipment as water cooling towers will be greatly inhibited by utilizing the mixture of polyvinylpyrrolidone with aminotri(methylenephosphonic acid), the combination of these compounds resulting in a synergistic action as regards the formation of scale.

SUMMARY OF THE INVENTION

This invention relates to compositions of matter which are utilized in the inhibition scale or salt precipitation in aqueous streams utilized in various applications such as cooling water tower systems. More specifically, the invention is concerned with these compositions of matter as well as a process for preventing the deposition of scale or metal salts on the surfaces of systems involving the use of water.

The formation of scale on the interior surfaces of metal equipment such as steel, aluminum, copper, etc. or alloys which are used for water circulation systems must be inhibited or prevented in order that the equipment can function in an efficient manner. When scale or even corrosion occurs in flow lines, pumps, heat exchangers, cooling towers, etc., the efficiency is impaired and when the efficiency drops to a certain point, corrective action such as replacement, descaling, etc. is required. Therefore, preventive steps must be undertaken in order to inhibit or prevent this problem.

By utilizing the compositions of matter of the present invention, it has now been discovered that the combination of the components hereinafter set forth will result in a synergistic effect on their inability to retard or inhibit the formation of scale as evidenced by the precipitating of calcium carbonate salt to a greater degree than was heretofore found possible.

It is therefore an object of this invention to provide a scale-inhibiting composition of matter.

A further object of this invention is found in a process employing the aforesaid composition of matter whereby the formation of scale in water-carrying systems will be greatly minimized.

In one aspect, an embodiment of this invention resides in a composition of matter for inhibiting the formation of scale in a fluid which is exposed to an aqueous stream which comprises a mixture of polyvinylpyrrolidone and a phosphonic acid comprising aminotri(methylenephosphonic acid).

Another embodiment of this invention resides in a method for inhibiting the formation of scale in a fluid system which is exposed to an aqueous stream which comprises adding to said stream a scale-inhibiting amount of a mixture of polyvinylpyrrolidone and a phosphonic acid comprising aminotri(methylenephosphonic acid).

A specific embodiment of this invention resides in a composition of matter which is utilized for inhibiting the formation of scale in a fluid system comprising a mixture of polyvinylpyrrolidone and aminotri(methylenephosphonic acid) in which the components are present in the mixture in a mole ratio in the range of from about 1:1 to about 1:10 moles of polyvinylpyrrolidone per mole of aminotri(methylenephosphonic acid).

Another specific embodiment of this invention is found in a method for inhibiting the formation of scale in a fluid system which is exposed to an aqueous stream which comprises adding to said stream a mixture of polyvinylpyrrolidone and aminotri(methylenephosphonic acid) in an amount in the range of from about 2 to about 25 ppm of said aqueous stream.

Other objects and embodiments will be found in the following further detailed description of the invention.

DETAILED DESCRIPTION OF THE INVENTION

It has now been discovered that by utilizing a combination of a phosphonic acid such as aminotri(methylenephosphonic acid) with polyvinylpyrrolidone, it is possible to prepare a composition of matter which may be used to inhibit the formation of scale. This combination of compounds gives an unexpected synergistic effect in inhibiting the precipitation of scale-producing metal salts such as calcium carbonate from an aqueous solution containing the same. The synergistic effect of the combination will be especially effective in the treatment of industrial water for the prevention of calcium carbonate scale in cooling water tower systems. The combinations which may be used for treatment of aqueous systems will contain the two components in a mole ratio in the range of from about 1:1 to about 1:10 moles of polyvinylpyrrolidone per mole of phosphonic acid. Generally speaking, the amount of composition which will be present in the aqueous stream will be from about 2 to about 25 parts per million (ppm) and preferably from about 5 to about 10 ppm, although it is contemplated within the scope of this invention that greater amounts of the composition may be used. However, it has been found that an effective amount for the inhibition of calcium carbonate scale will lie within the aforementioned range, thus lowering the cost of the system. The synergistic effect of an admixture of the aforesaid phosphonic acids with polyvinylpyrrolidone was unexpected in view of the fact that, although the phosphonic acids were known to be an effective threshold stabilization agent for super-saturated solutions of metal salts such as calcium carbonate, polyvinylpyrrolidone alone in an alkaline medium, was not known to be a threshold stabilization agent but as a complexing agent for other organic molecules. As was previously discussed, a known method for the removal of scale comprises treating the coated surface with an acid which may contain other compounds which serve to protect the metal when the acid solution is used. However, relatively extreme care is required in order to protect the metal against being eroded by the cleaning action. In contradistinction to this, the scale-inhibiting composition of the present invention is used in an alkaline medium, thereby eliminating the necessity for carefully controlling the acidity of the aqueous stream.

The compositions of matter in the amount hereinbefore set forth are generally added to the water flowing through the system and thus will circulate through said system. The amount of scale-inhibiting composition of matter which is used in the aqueous system will vary depending upon the system to which the composition is added as well as other parameters such as the temperature of the aqueous system, the pH, the amount of water, etc. The inhibiting effect of the composition of the matter will minimize the scale deposits which may lead to plugging, pumping difficulties, loss of heat transfer, etc. and thus insure an efficient operation of the system.

The following examples are given to illustrate the scale-inhibiting compositions of matter and the advantages in utilizing such a composition of matter for the inhibition of scale. However, it is to be understood that these examples are given merely for purposes of illustration and that the present invention is not necessarily limited thereto.

EXAMPLE I

A test solution was prepared by admixing 1.472 grams of calcium chloride, 1.536 grams of sodium bicarbonate, and 0.106 grams of sodium carbonate, said solution having a volume of 1 liter, a calcium hardness concentration of 1000 ppm and a total alkalinity of 1000 ppm, said total alkalinity being composed of 900 ppm bicarbonate alkalinity and 100 ppm of carbonate alkalinity. The solution was placed in a constant temperature oil bath and maintained at 100° F. for the entire test. In order to provide agitation and a scrubbing action, the solutions were sparged with compressed gas comprising either air or nitrogen at a flow rate of 100 cc per minute. At the time intervals of 24, 48, and 72 hours respectively, the solutions were evaluated with respect to pH, calcium hardness, carbonate alkalinity concentration and alkalinity concentration.

In the first experiment, 800 cc of the solution was placed in a beaker and sparged with air at a flow rate of 100 cc per minute at a temperature of 100° F. The results of this test are set forth in Table I below in which CaH is the calcium hardness, P/Alk is the carbonate alkalinity expressed as calcium carbonate concentration, and Tot/Alk is the total alkalinity expressed as the combined carbonate and bicarbonate remaining in the solution.

TABLE 1

| Time | | Blank |
|---|---|---|
| 24 hours | pH | 8.1 |
| | CaH | 140 |
| | P/Alk | 0 |
| | Tot/Alk | 140 |
| 48 hours | pH | 8.0 |
| | CaH | 100 |
| | P/Alk | 0 |
| | Tot/Alk | 100 |
| 72 hours | pH | 8.12 |
| | CaH | 100 |
| | P/Alk | 0 |
| | Tot/Alk | 100 |

EXAMPLE II

In a manner similar to that set forth in Example I above, 800 cc's of the solution were placed in two beakers which were sparged with air at a flow rate of 100 cc per minute at a temperature of 100° F. In one beaker labeled A, 5 ppm of aminotri(methylenephosphonic acid), hereinafter designated ATMP, was added while in the second beaker labeled B, 10 ppm of the acid was added. After periods of 24 hours, 48 hours and 72 hours, each test solution was analyzed and the results of these analyses are set forth in Table 2 below.

TABLE 2

| Time | | Beaker A ATMP 5 ppm | Beaker B ATMP 10 ppm |
|---|---|---|---|
| 24 hours | pH | 8.90 | 8.85 |
| | CaH | 460 | 470 |
| | P/Alk | 90 | 100 |
| | Tot/Alk | 460 | 470 |
| 48 hours | pH | 9.25 | 9.1 |
| | CaH | 425 | 450 |

TABLE 2-continued

| Time | | Beaker A ATMP 5 ppm | Beaker B ATMP 10 ppm |
|---|---|---|---|
| | P/Alk | 105 | 104 |
| | Tot/Alk | 425 | 430 |
| 72 | pH | 9.18 | 9.25 |
| hours | CaH | 420 | 430 |
| | P/Alk | 105 | 120 |
| | Tot/Alk | 418 | 430 |

EXAMPLE III

To illustrate the unexpected synergistic activity of the scale-inhibiting compositions of matter of the present invention, the above experiments were repeated. Again, 800 cc's of the solution were placed in two beakers designated C and D. To Beaker C was added 5 ppm of a scale-inhibiting composition of matter comprising a mixture of polyvinylpyrrolidone, hereinafter designated PVP and ATMP in a mole ratio of 1 mole to PVP per 2 moles of ATMP. As in the previous examples, the solutions were evaluated at the end of 24 hours, 48 hours and 72 hours. In Beaker D, 10 ppm of the inhibitor composition was added and the test solutions were again evaluated. The results of these evaluations are set forth in Table 3 below.

TABLE 3

| Time | | Beaker C PVP - ATMP ½ MOL RATIO ATMP 5 ppm | Beaker D ATMP 10 ppm |
|---|---|---|---|
| 24 | pH | 8.86 | 8.63 |
| hours | CaH | 480 | 590 |
| | P/Alk | 100 | 80 |
| | Tot/Alk | 476 | 590 |
| 48 | pH | 8.93 | 8.82 |
| hours | CaH | 440 | 520 |
| | P/Alk | 100 | 96 |
| | Tot/Alk | 440 | 520 |
| 72 | pH | 8.89 | 8.94 |
| hours | CaH | 440 | 460 |
| | P/Alk | 100 | 100 |
| | Tot/Alk | 440 | 460 |

EXAMPLE IV

In this example, the test solution was placed in two beakers labeled E and F, and 5 ppm of an inhibiting composition comprising a mixture of PVP and ATMP in a molar ratio of 1 mole of PVP per 5 moles of ATMP was placed in Beaker E. In like manner, 10 ppm of this inhibiting composition was placed in Beaker F. The results of the evaluation after 24 hours, 48 hours and 72 hours are set forth in Table 4 below.

TABLE 4

| Time | | Beaker E PVP - ATMP 1/5 MOL RATIO ATMP 5 ppm | Beaker F ATMP 10 ppm |
|---|---|---|---|
| 24 | pH | 8.5 | 8.6 |
| hours | CaH | 460 | 560 |
| | P/Alk | 110 | 100 |
| | Tot/Alk | 480 | 580 |
| 48 | pH | 8.75 | 8.6 |
| hours | CaH | 430 | 490 |
| | P/Alk | 110 | 120 |
| | Tot/Alk | 436 | 488 |
| 72 | pH | 8.70 | 8.82 |
| hours | CaH | 430 | 460 |
| | P/Alk | 120 | 120 |
| | Tot/Alk | 432 | 458 |

EXAMPLE V

The experiments described in Examples 1-5 above were repeated, the only difference being that the beakers containing the saturated solution were sparged with nitrogen at a flow rate of 100 cc per minute at a temperature of 100° F. in place of air. As in the above experiments, after intervals of 24 hours, 48 hours and 72 hours, respectively, the test solutions were evaluated with respect to pH, calcium hardness concentration, carbonate alkalinity concentration and total alkalinity concentration. The results of these tests are set forth in Table 5 below. As in the preceding experiments, Beaker A contained no scale inhibitor, Beaker B contained 5 ppm of ATMP, Beaker C contained 10 ppm of ATMP, Beaker D contained 5 ppm of the scale inhibitor of the present invention comprising a mixture of PVP and ATMP in a 1:2 mole ratio, Beaker E contained 10 ppm of this inhibitor, Beaker F contained 5 ppm of a scale inhibitor composition comprising a mixture of PVP and ATMP in a 1:5 mole ratio and Beaker G contained 10 ppm of this inhibitor.

TABLE 5

| Time | | Beaker A | Beaker B | Beaker C | Beaker D | Beaker E | Beaker F | Beaker G |
|---|---|---|---|---|---|---|---|---|
| 24 | pH | 8.30 | 9.01 | 8.99 | 9.01 | 9.03 | 9.01 | 9.04 |
| hrs. | CaH | 70 | 320 | 380 | 320 | 460 | 380 | 460 |
| | P/Alk | 0 | 90 | 98 | 90 | 96 | 100 | 100 |
| | Tot/Alk | 70 | 320 | 380 | 320 | 458 | 380 | 464 |
| 48 | pH | 9.01 | 9.12 | 9.54 | 9.54 | 9.34 | 9.26 | 9.39 |
| hrs. | CaH | 70 | 270 | 310 | 280 | 360 | 320 | 350 |
| | P/Alk | 16 | 90 | 110 | 100 | 104 | 100 | 120 |
| | Tot/Alk | 70 | 266 | 310 | 278 | 360 | 320 | 348 |
| 72 | pH | 9.06 | 9.56 | 9.57 | 9.55 | 9.34 | 9.67 | 9.44 |
| hrs. | CaH | 70 | 250 | 275 | 260 | 330 | 290 | 320 |
| | P/Alk | 15 | 100 | 110 | 100 | 110 | 100 | 120 |
| | Tot/Alk | 70 | 245 | 270 | 260 | 326 | 290 | 320 |

EXAMPLE IV

The experimental data from the above tables were evaluated with respect to the inhibiting power of ATMP as compared to the inhibiting properties or ability of the composition of matter of the present invention, namely, a mixture of PVP and ATMP in mole ratios ranging from 1:2 to 1:5 moles of PVP per mole of ATMP. Tables 6 and 7 below are based on the calcium hardness data, the numbers inside the parenthesis being the percent increase of soluble calcium hardness which was found when using a synergistic mixture of PVP and ATMP.

TABLE 6

| Hours | ATMP 5 ppm | ATMP 10 ppm | PVP/ATMP Ratio 1:2 5 ppm | PVP/ATMP Ratio 1:2 10 ppm | PVP/ATMP Ratio 1:5 5 ppm | PVP/ATMP Ratio 1:5 10 ppm |
|---|---|---|---|---|---|---|
| 24 | 460 | 470 | 480 (4.3%) | 590 (25.5%) | 460 (0%) | 560 (19.1%) |
| 48 | 425 | 450 | 440 (3.5%) | 520 (15.6%) | 430 (1.2%) | 490 (8.9%) |
| 72 | 420 | 430 | 440 (4.8%) | 460 (7.0%) | 430 (2.4%) | 460 (7.0%) |

TABLE 7

| Hours | ATMP 5 ppm | ATMP 10 ppm | PVP/ATMP Ratio 1:2 5 ppm | PVP/ATMP Ratio 1:2 10 ppm | PVP/ATMP Ratio 1:5 5 ppm | PVP/ATMP Ratio 1:5 10 ppm |
|---|---|---|---|---|---|---|
| 24 | 320 | 380 | 320 (0%) | 460 (21.0%) | 380 (18.8%) | 460 (21.0%) |
| 48 | 270 | 310 | 280 (3.7%) | 360 (16.1%) | 320 (18.5%) | 350 (12.4%) |
| 72 | 250 | 275 | 260 (4.0%) | 330 (20.0%) | 290 (16.0%) | 320 (16.3%) |

It is readily apparent from a review of the data in Tables 6 and 7 that 92% of the mixtures of PVP and ATMP showed an increase in calcium hardness concentration over the corresponding value for ATMP alone, no decrease in the calcium hardness concentration being present. In addition, half of the values disclose an increase in hardness concentration greater than 10%, a greater percent increase being shown when the solution was sparged with nitrogen.

EXAMPLE VII

To show the inability of PVP to act as a scale inhibitor composition in an alkaline medium, a series of experiments were performed in which a solution similar in nature to that hereinbefore utilized was treated with 5 ppm and 10 ppm respectively for a period of 24 hours, 48 hours and 72 hours. Again, the solutions were evaluated with respect to pH, calcium hardness concentration, calcium alkalinity concentration and total alkalinity concentration. The results of this test are set forth in Table 8 below.

TABLE 8

| Time | | Beaker A PVP 5 ppm | Beaker B PVP 10 ppm |
|---|---|---|---|
| 24 hours | pH | 8.10 | 8.12 |
| | CaH | 140 | 145 |
| | P/Alk | 0 | 0 |
| | Tot/Alk | 140 | 145 |
| 48 hours | pH | 8.00 | 8.05 |
| | CaH | 100 | 106 |
| | P/Alk | 0 | 0 |
| | Tot/Alk | 100 | 106 |
| 72 hours | pH | 8.12 | 8.10 |
| | CaH | 100 | 102 |
| | P/Alk | 0 | 0 |

TABLE 8-continued

| Time | | Beaker A PVP 5 ppm | Beaker B PVP 10 ppm |
|---|---|---|---|
| | Tot/Alk | 100 | 102 |

It is readily apparent from the above table that PVP per se does not function as a scale inhibitor in an alkaline medium and therefore the combination of this compound with ATMP resulted in an unexpected synergistic effect as concerns the scale-inhibiting properties of the combination.

We claim as our invention:

1. A composition of matter for inhibiting the formation of scale in a fluid system which is exposed to an aqueous stream which comprises an alkaline mixture of polyvinyl pyrrolidone and aminotri(methylene phosphonic acid).

2. The composition of matter of claim 1 in which said polyvinylpyrrolidone and said aminotri(methylenephosphonic acid) are present in said mixture in a mole ratio in the range of from about 1:1 to about 1:10 moles of polyvinylpyrrolidone per mole of aminotri(methylenephosphonic acid).

3. A method for inhibiting the formation of scale in a fluid system which is exposed to an aqueous stream which comprises adding to said stream, in an alkaline medium, a scale-inhibiting amount of a mixture of polyvinylpyrrolidone and aminotri(methylenephosphonic acid).

4. The method as set forth in claim 3 in which said polyvinylpyrrolidone and said amino-tri(methylphosphonic acid) are present in said mixture in a mole ratio in the range of from about 1:1 to about 1:10 moles of polyvinylpyrrolidone per mole of amino-tri(methylenephosphonic acid).

5. The method as set forth in claim 3 in which said mixture is present in said aqueous system in an amount in the range of from about 2 to about 25 ppm of said aqueous stream.

6. The method as set forth in claim 3 in which said scale comprises precipitated calcium carbonate.

7. The method as set forth in claim 3 in which said aqueous stream comprises water in a cooling tower.

* * * * *